April 12, 1932. H. LACROIX 1,853,770
FLEXIBLE POWER TRANSMISSION DEVICE
Filed Nov. 1, 1929
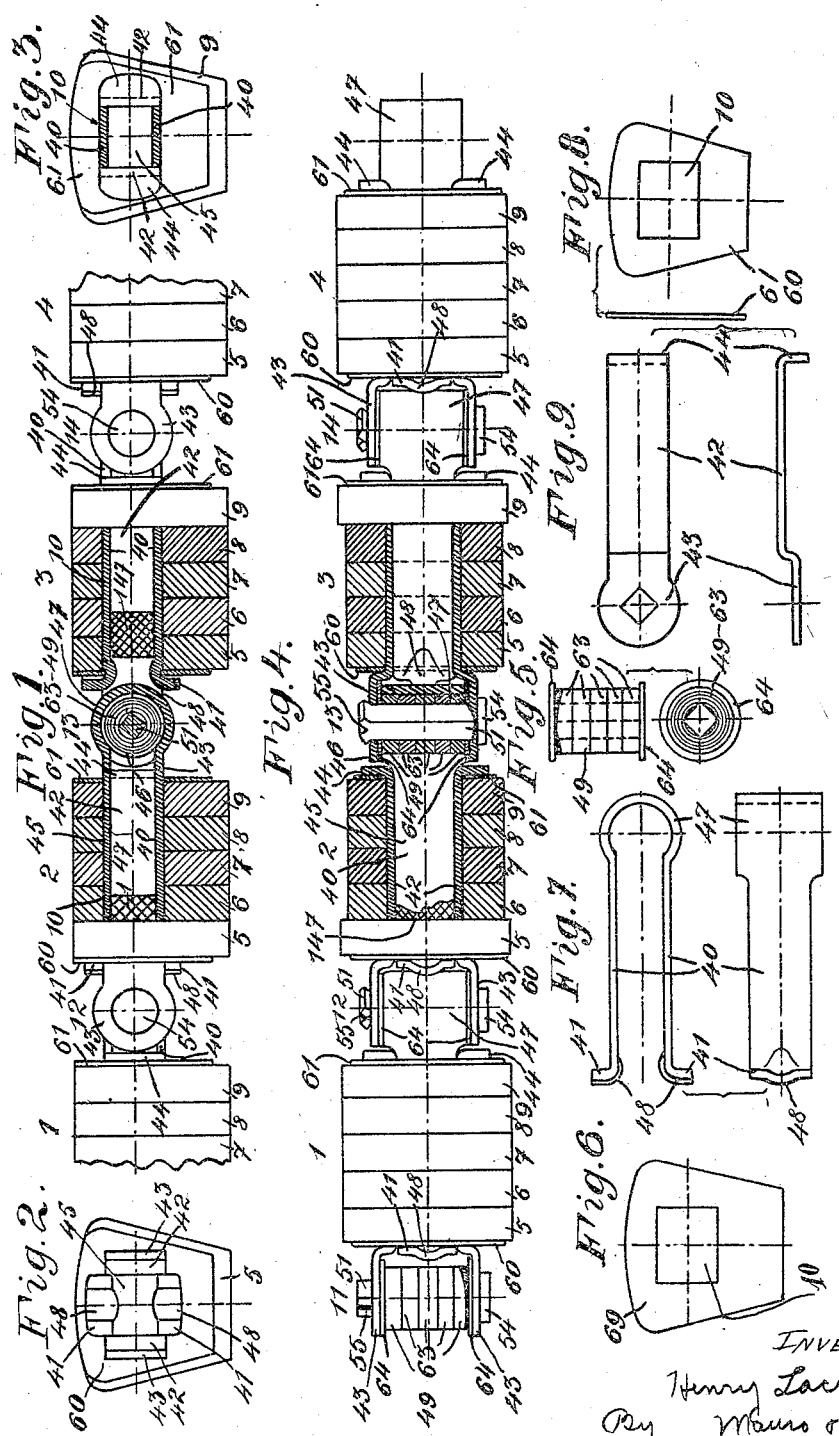

Patented Apr. 12, 1932

1,853,770

UNITED STATES PATENT OFFICE

HENRY LACROIX, OF GENEVA, SWITZERLAND

FLEXIBLE POWER TRANSMISSION DEVICE

Application filed November 1, 1929, Serial No. 404,137, and in Switzerland November 3, 1928.

The invention has for its object a flexible power transmission device.

It consists in the known manner of a set of metallic power transmission elements which are subject to traction and are assembled with pivoted joints, and also of flexible members which are subject to pressure and are situated between the metallic members.

The apparatus however differs from the preceding, by the fact that the pivoted joint between the metallic members is made by means of a metallic element and a non-metallic element which latter has a great strength and is not subject to traction.

The accompanying drawings show by way of example an embodiment of the invention.

Figure 1 is a partial view of the apparatus, which is partly in section.

Figure 2 is a side view of a set of members according to Figure 1, viewed from right to left.

Figure 3 is a section of the apparatus shown in Figure 1, viewed from right to left.

Figure 4 is a plan view corresponding to Figure 1, partly in section.

Figures 5 to 9 show various details.

Each of the members 1—2—3—4 which is subject to pressure, has a general trapezoidal cross-section, and comprises a set of plates 5—6—7—8—9 placed in contact and consisting of leather or india rubber. In each of said members is a hollow space 10 extending in the transverse direction from one end of said member to the other and of which the cross section is square.

The metallic members 11—12—13—14 are of uniform construction; each member comprises a U-shaped piece 40 having flanges 41 at one end, and also two plates 42, having on one of their respective ends a half-round part 43, and on the other end an outwardly bent part 44. The said half-round part 43 is further from the middle plane of the said member than the plate 42, and the bent middle part 47 of the U-shaped member 40 is wider than the main part of the same. Both plates 42 enclose the member 40, leaving on one side a hollow space 45 and on the other side a relatively longer metallic cylinder 46, which has two parts for coupling purposes.

A solid member or core 147 which is held back by projections 48 of the member 40, is at the end of the recess 45 opposite to the cylinder 46, and it prevents it from approaching the flange or wing 41, as well as from leaving the plates 60 and 61, which will be further specified.

The central curved part 47 of the member 40 forms a coupling portion, and it is rotatable about an axle 49 mounted on the other coupling portion. The said axle 49 carries very strong disks 63 which may consist of rawhide or fibre, which are not subject to traction; said disks are assembled on an axle or pin 51 of rectangular section, which is mounted in the rectangular apertures of the part 43 of the plate 42, in such manner that the plates cannot be drawn together. The plates 64, consisting of the same material as the plates 63, are so disposed on the respective ends of the said axle 49, that they prevent all friction between the metallic parts 47 and 43. The axle 51 is provided with a head 54 at one end; and is slotted at 55 at the other end, so that the two parts at the respective sides of the slot can be driven apart, in order that the two plates 42 will be held together in the longitudinal direction. The slotted part 55 allows the said portion of the coupling to be moved together or expanded with facility.

The aforesaid members are assembled as follows:—

The operator slides from left to right in the aperture 10 of a flexible member (2 for instance) both plates 42 whose overlapping surfaces 44 is leaned against the plate 61 of right. The member 40 is slid from right to left in the said aperture 10, that the portion 41 is first brought together, and hence the said portion can slide into the same. When the wings 41 have been brought through the aperture of the plate 60, the said wings are left free to expand, so that they will—by means of said plate—rest upon the left hand side of the member 2. The core 147 is then pushed in.

The metallic members and the flexible members which are drawn with it, can again be connected together, in order to form the flexible power coupling device. For this purpose there is slid in the middle curved part of the member 40 a metallic member (for instance 13), pertaining to the axle 49 and to the plates 64. In this event both parts 43 of the plates 42 pertaining to the adjacent members are placed in the proper position, and finally the axles 51 are inserted through the whole device, whereby the parts of the axle 51, adjacent the slot 55, are expanded in order to secure the whole device together.

In this manner the elements or groups consisting of the metallic and flexible members 11 and 1—12, 2—13, 3—14 and 4, are held in position end to end, by which the adjacent coupling elements are held together.

The members 1—2—3—4 which are held together between the flanges or wings 11—12—13—14, are subjected to pressure; the members 11, 12, 13, 14 are brought together by the transmission of a traction through the flexible transmission device, also subjected to traction.

Due to the fact that each joint or link pertains to a metallic element, which is rotatable on an adjacent and non-wearing element 49, the transmission element can be used for a great length of time and without lubrication, and with practically no wear, which are the principal desiderata in flexible power transmission devices. In such apparatus, the links or separate members of each part are the elements which are subject to the most wear, and in the present apparatus, due to the special arrangements of the parts 49 and 47, each pin or axle of the respective links has a very large traction surface. Further, the parts 49 and 47 form a compact whole, and this protects the operating axles of the links.

In case a certain lubrication should be desired, in the space 45, when the whole of the power transmission apparatus is put together, it is possible to employ a lubricating device which is inserted into a duct.

Since the said members subjected to pressure are subdivided in their longitudinal direction, their capacity for pressure can be changed as desired. The several plates, according to use, may consist of different substances, such as leather, india rubber, etc. The flexible members may be independent and may consist of a single piece.

The plates 60, 61 may be eliminated, and the flanges 41, 44, which have an extended width, rest directly upon the members 1, 2, 3, 4.

The said members which are subject to pressure are not necessarily of a trapezoidal cross section, and they may have a circular or other section.

What I claim is:—

1. In a driving belt of the link type provided with elastic units adapted to transmit the tensile stress from one link to the other through their being compressed, an axle made of a tough organic substance, a metallic U-shaped member connected to one link and closely surrounding said axle, two metallic plates connected to the adjacent link secured to said axle, whereby a large surface of contact is provided between the axle and the inner surface of the U-shaped member in which it rotates, and said axle is efficiently protected against dust and other foreign substances.

2. In a driving belt of the link type provided with elastic blocks adapted to transmit the tensile stress from one link to the other through their being compressed, an axle made of a tough organic substance, a metallic U-shaped member connected to one link and closely surrounding said axle, two metallic plates connected to the adjacent link provided each with an aperture coaxial with said axle, and fixation means passing through said apertures for securing said axle to said plate, whereby a large surface of contact is provided between the axle and the inner surface of the U-shaped member in which it rotates, and said axle is efficiently protected against dust and other foreign substances.

3. In a driving belt of the link type provided with elastic blocks adapted to transmit the tensile stress from one link to the other through their being compressed, an axle made of rawhide, a metallic U-shaped member connected to one link and closely surrounding said axle, two metallic plates connected to the adjacent link provided each with an aperture coaxial with said axle, and fixation means passing through said apertures for securing said axle to said plate, whereby a large surface of contact is provided between the axle and the inner surface of the U-shaped member in which it rotates, and said axle is efficiently protected against dust and other foreign substances.

4. In a driving belt of the link type provided with elastic blocks adapted to transmit the tensile stress from one link to the other through their being compressed, an axle made of fiber, a metallic U-shaped member connected to one link and closely surrounding said axle, two metallic plates connected to the adjacent link provided each with an aperture coaxial with said axle, and fixation means passing through said apertures for securing said axle to said plate, whereby a large surface of contact is provided between the axle and the inner surface of the U-shaped member in which it rotates, and said axle is efficiently protected against dust and other foreign substances.

5. In a driving belt of the link type, provided with elastic blocks adapted to transmit the tensile stress from one link to the other through their being compressed, a hollow axle made of a tough organic substance, a metallic U-shaped member connected to one link and closely surrounding said axle, two metallic plates connected to the adjacent link provided each with a rectangular aperture coaxial with said axle, and a rectangular pin passing through said apertures and through the axle for securing said axle to said plates, whereby a large surface of contact is provided between the axle and the inner surface of the U-shaped member in which it rotates, and said axle is efficiently protected against dust and other foreign substances.

6. In a driving belt of the link type provided with elastic blocks adapted to transmit the tensile stress from one link to the other through their being compressed, a hollow axle made of a tough organic substance, a metallic U-shaped member connected to one link and closely surrounding said axle, two metallic plates connected to the adjacent link provided each with a rectangular aperture coaxial with said axle, and a rectangular pin passing through said apertures and through the axle for securing said axle to said plates, whereby a large surface of contact is provided between the axle and the inner surface of the U-shaped member in which it rotates, and said axle is efficiently protected against dust and other foreign substances, and a solid member disposed between the branches of the U-shaped member for maintaining them at the proper distance from each other.

7. In a driving belt of the link type provided with elastic blocks adapted to transmit the tensile stress from one link to the other through their being compressed, an axle made of a tough organic substance provided with a rectangular axial aperture, a metallic U-shaped member connected to one link and adapted to closely surround said axle, two metallic plates connected to the adjacent link provided each with a rectangular aperture having their ends applied against the edges of the curved portion of the U-shaped member, a rectangular pin passing through said aperture and through the axle for securing the axle to said plates, whereby a large surface of contact is provided between the axle and the inner surface of the U-shaped member in which it rotates and said axle is efficiently protected against dust and other foreign substances, and a solid member disposed between the branches of the U-shaped member for maintaining them at the proper distance from each other.

8. In a driving belt of the link type provided with elastic blocks adapted to transmit the tensile stress from one link to the other through their being compressed, an axle made of a tough organic substance provided with a rectangular axial aperture, a metallic U-shaped member connected to one link and adapted to closely surround said axle, two metallic plates connected to the adjacent link provided each with a rectangular aperture having their ends parallel to the edges of the curved portion of the U-shaped member, disks of a tough organic material interposed between said edges and said plates, a rectangular pin passing through said aperture and through the axle for securing said axle to said plates, whereby a large surface of contact is provided between the axle and the inner surface of the U-shaped member in which it rotates and said axle is efficiently protected against dust and other foreign substances, and a solid member disposed between the branches of the U-shaped member for maintaining them at the proper distance from each other.

9. In a driving belt of the link type, provided with elastic blocks adapted to transmit the tensile stress from one link to the other through their being compressed, a hollow axle made of a tough organic substance, a metallic U-shaped member connected to one link and closely surrounding said axle, the curved part of said member that surrounds the axle having a larger width than the remaining part of the member, two inwardly cranked metallic plates connected to the adjacent link provided each with a rectangular aperture co-axial with said axle, and a rectangular pin passing through said apertures and through the axle for securing said axle to said plates, whereby a large surface of contact is provided between the axle and the inner surface of the U-shaped member in which it rotates and said axle is efficiently protected against dust and other foreign substances.

In testimony whereof I have signed this specification.

HENRY LACROIX.